(12) United States Patent
Yoshida

(10) Patent No.: US 7,923,970 B2
(45) Date of Patent: Apr. 12, 2011

(54) CHARGE CONTROLLING CIRCUIT

(75) Inventor: Nobuhito Yoshida, Osaka (JP)

(73) Assignee: Kyocera Corporation, Kyoto (JP)

( * ) Notice: Subject to any disclaimer, the term of this patent is extended or adjusted under 35 U.S.C. 154(b) by 767 days.

(21) Appl. No.: 11/957,822

(22) Filed: Dec. 17, 2007

(65) Prior Publication Data

US 2008/0143300 A1 Jun. 19, 2008

(30) Foreign Application Priority Data

Dec. 18, 2006 (JP) ................................. 2006-339874

(51) Int. Cl.
*H02J 7/04* (2006.01)
*H04R 17/00* (2006.01)
*G01J 3/06* (2006.01)
(52) U.S. Cl. ........ 320/155; 320/154; 320/150; 320/145; 320/125; 367/180; 347/119; 356/308
(58) Field of Classification Search .................. 320/155
See application file for complete search history.

(56) References Cited

U.S. PATENT DOCUMENTS

| | | | |
|---|---|---|---|
| 4,992,720 A | | 2/1991 | Hata |
| 5,237,257 A | * | 8/1993 | Johnson et al. ............... 320/106 |
| 5,656,917 A | * | 8/1997 | Theobald ...................... 320/106 |
| 5,850,134 A | * | 12/1998 | Oh et al. ....................... 320/106 |
| 6,031,353 A | * | 2/2000 | Banyas et al. ................. 320/112 |
| 6,859,012 B2 | * | 2/2005 | McNeill ........................ 320/133 |
| 6,982,541 B2 | * | 1/2006 | Zick et al. ..................... 320/114 |

FOREIGN PATENT DOCUMENTS

| | | |
|---|---|---|
| JP | 01-283027 | 11/1989 |
| JP | 07-312231 | 11/1995 |
| JP | 08-149708 | 6/1996 |
| JP | 08-298138 | 11/1996 |
| JP | 2000-139036 | 5/2000 |
| JP | 20034824 A | 1/2003 |

OTHER PUBLICATIONS

Office Action from Japanese Patent Application No. 2006-339874, mailed on Oct. 5, 2010.

* cited by examiner

*Primary Examiner* — Edward Tso
*Assistant Examiner* — Yalkew Fantu
(74) *Attorney, Agent, or Firm* — Morrison & Foerster LLP

(57) ABSTRACT

A charge controlling circuit controls charging of a lithium-ion rechargeable battery. An electric power supplied from an external charger to the lithium-ion rechargeable battery is taken by a charging terminal. When the charging terminal is connected to the external charger, whether or not a charge prohibition condition is satisfied is determined by a CPU. A charging operation is prohibited when the charge prohibition condition is satisfied, but is permitted when the charge prohibition condition is not satisfied. Here, the charge prohibition condition includes a shortest time condition that a time during which the charging terminal is detached from the external charger is above a defined time decided in view of an instantaneous power interruption.

7 Claims, 6 Drawing Sheets

(A) RESTART OF CHARGE (B) PROHIBITION OF CHARGE (C) PERMISSION OF CHARGE

.# CHARGE CONTROLLING CIRCUIT

CROSS REFERENCE OF RELATED APPLICATION

The disclosure of Japanese Patent Application No. 2006-339874 is incorporated herein by reference.

BACKGROUND OF THE INVENTION

1. Field of the Invention

The present invention relates to a charge controlling circuit. More specifically, the present invention relates to a charge controlling circuit which is applied to a mobile terminal, and controls a charging operation of a secondary battery by an electric power supplied from an external charger.

2. Description of the Related Art

In a general related art of this kind of a circuit, when a mobile terminal having a battery in a fully-charged state is detached from a charger, a timer is activated. When the mobile terminal is connected to the charger again, it is determined whether or not a counted time by the timer is within a predetermined time, and whether or not a battery voltage is equal to or more than a threshold value. If both of the determination results are affirmative, it is determined to be a fully charged state. On the contrary thereto, if at least one of the determination results is negative, recharging the battery is started, and detecting the fully-charged state is performed based on a rate of temperature rise.

However, in the related art, if a detached time during which the mobile terminal having the battery in a fully-charged state is detached from the charger is within the predetermined time, a charging operation (except for small current charging) is not executed, but if the detached time is equal to or more than the predetermined time, a charging operation is executed. In other words, if the mobile terminal having the battery being in a fully-charged state is detached for the predetermined time or more and then attached, again and again, the charging operation is repeatedly executed to cause a deterioration of the battery.

SUMMARY OF THE INVENTION

In one aspect of the present invention, a charge controlling circuit comprises: a first determiner for determining whether or not a charging power supplied from an external charger to a secondary battery is present; a second determiner for determining whether or not a charge prohibition condition is satisfied when it is determined that a charging power supplied from the external charger to the secondary battery is present by the first determiner; a prohibiter for prohibiting a charging operation when it is determined that the charge prohibition condition is satisfied by the second determiner; and a permitter for permitting a charging operation when it is determined that the charge prohibition condition is not satisfied by the second determiner, wherein the charge prohibition condition includes a time condition that a time during which it is determined by the first determiner that the charging power supplied from the external charger to the secondary battery is not present is above a defined time including a predetermined time or more.

A first determiner determines whether or not a charging power supplied from an external charger to a secondary battery is present. When the determination result by the first determiner is updated from a negative result to an affirmative result, it is determined whether or not a charge prohibition condition is satisfied by a second determiner. A charging operation is prohibited by a prohibiter when the determination result by the second determiner is affirmative while the charging operation is permitted by a permitter when the determination result by the second determiner is negative. Here, the charge prohibition condition includes a time condition that a time during which the determination result by the first determiner is negative is above a defined time including a predetermined time or more.

Accordingly, when a time during which a charging power is not present is above the defined time, a charging operation is prohibited while when a time during which a charging power is present is equal to or less than the defined time, the charging operation is permitted. Thus, when the supply of the charging power is interrupted for time above the defined time, even if a charging power is supplied thereafter, a charging operation is prohibited. Thus, it is possible to prevent deterioration of the secondary battery due to frequent charging operations. On the contrary thereto, when a time during which the supply of the charging power is interrupted is equal to or less than the defined time, a charging operation is rapidly restarted.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
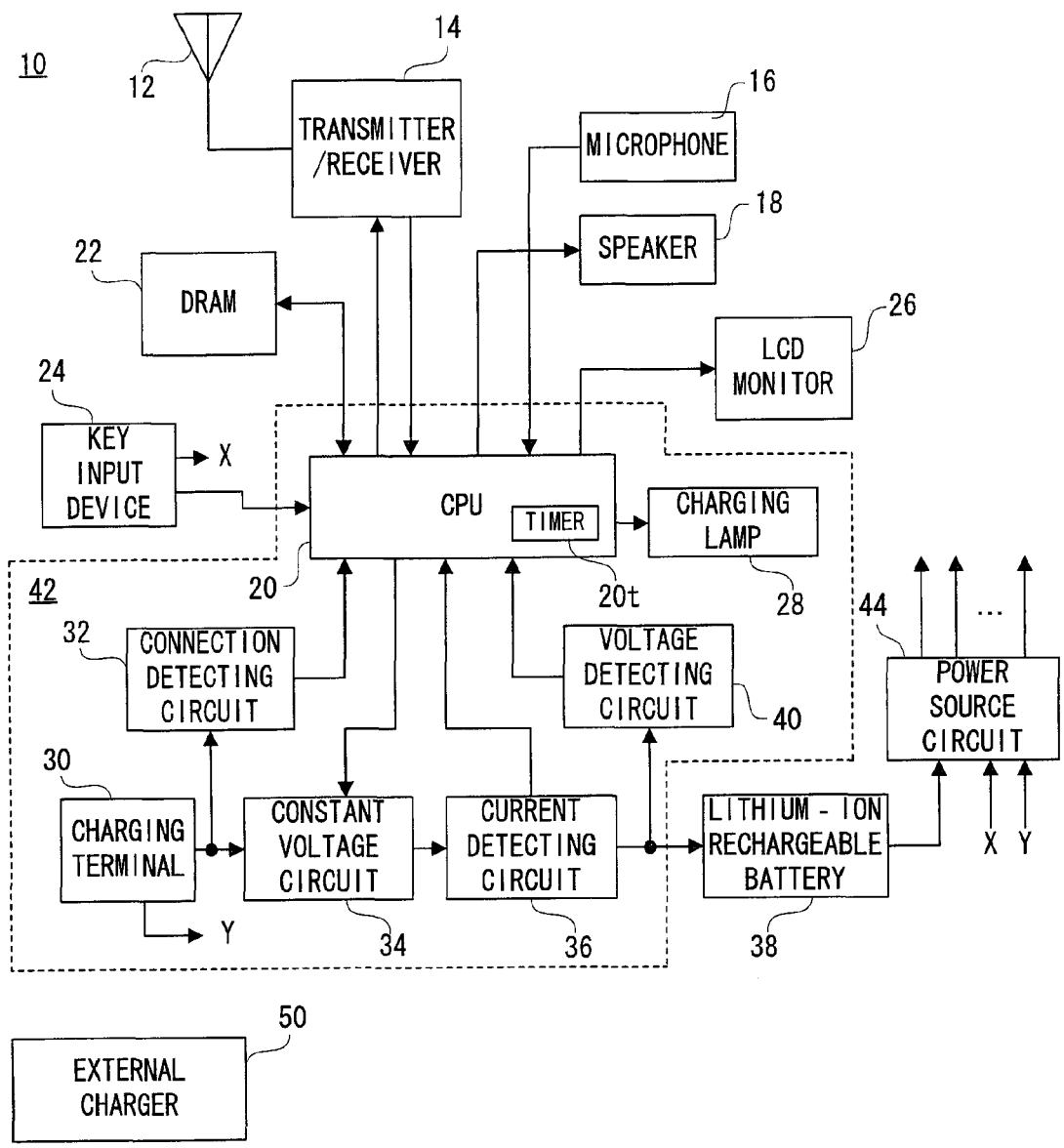
FIG. 1 is a block diagram showing a configuration of one embodiment of the present invention.

Referring to FIG. 1, a mobile communication terminal 10 of this embodiment includes a power source circuit 44 for supplying an electric power on the basis of a voltage of a lithium-ion rechargeable battery 38 being a secondary battery to the entire system. The power source circuit 44 is activated in response to a power-on operation by a key input device 24, and stopped in response to a power-off operation by the key input device 24. During a period from the power-off operation to the power-on operation also, the power source circuit 44 is activated in response to a connection of a charging terminal 30 to an external charger 50, and is stopped in response to a detachment of the charging terminal 30 from the external charger 50.

It should be noted that a period from a power-on operation to a power-off operation is defined as a "power-on period", and a period from a power-off operation to a power-on operation is defined as a "power-off period". In addition, a period during which the power source circuit 44 is activated by a connection of the charging terminal 30 to the external charger 50 during the power-off period is defined as a "forcedly-on period".

When a call-out operation is performed by the key input device 24 during the power-on period, the CPU 20 controls a transmitter/receiver 14 to output a call-out signal. The output call-out signal is released from an antenna 12 to be transmitted to a telephone set of an intended party via a mobile communication network including a base station. When the intended party performs a call-in operation, a state that a telephone communication can be made is established.

After a shift to the state that a telephone communication can be made, when a conversation end operation is performed by the key input device 24, the CPU 20 controls the transmitter/receiver 14 to transmit a conversation end signal to the intended party. After transmission of the conversation end signal, the CPU 20 ends the telephone communication processing. Also, in a case that a conversation end signal is first received from the intended party, the CPU 20 ends the telephone communication processing. Furthermore, in a case that a conversation end signal is received from the mobile communication network not by the intended party, the CPU 20 ends the telephone communication processing.

When a call-out signal from an intended party is received by the antenna 12 during the power-on period, the transmitter/receiver 14 notifies an incoming call to the CPU 20. The CPU 20 outputs calling source information described in the incoming call notification to the LCD 26, and outputs an incoming call tone from a speaker for incoming call notification not shown. When a call-in operation is performed by the key input device 24, a state that a telephone communication can be made is established.

In the state that a telephone communication can be made, next processing is executed. A modulated audio signal (high frequency signal) transmitted from the intended party is received by the antenna 12. The received modulated audio signal is subjected to demodulation processing and decode processing by the transmitter/receiver 14. A received voice signal thus obtained is output from a speaker 18.

A voice signal to be transmitted captured by the microphone 16 is subjected to encode processing and modulation processing by the transmitter/receiver 14. A modulated audio signal thus generated is transmitted to the intended party by means of the antenna 12 as described above.

Although a detailed description will be omitted, the mobile communication terminal of this embodiment has a function of sending and receiving an e-mail message. The e-mail message is also sent and received through the antenna 12 during the power-on period. A received mail message is stored in a flash memory not shown.

A charge controlling circuit 42 performs a charging operation of the lithium-ion rechargeable battery 38 during the power-on period and the forcedly-on period as discussed below. A connection of the charging terminal 30 to the external charger 50 is detected by a connection detecting circuit 32. That is, the connection detecting circuit 32 detects presence or absence of a connection by noting a voltage that is applied to the charging terminal 30 and changes before or after the connection to the external charger 50. When the charging terminal 30 is not connected to the external charger 50, a detection result representing "disconnection" is applied from the connection detecting circuit 32 to the CPU 20. On the contrary thereto, when the charging terminal 30 is connected to the external charger 50, a detection result representing "connection" is applied from the connection detecting circuit 32 to the CPU 20.

The CPU 20 executes resetting and starting of a timer 20$t$ when the detection result is changed from the "connection" to the "disconnection", and stops the timer 20$t$ when the detection result is changed from the "disconnection" to the "connection". Accordingly, a counted time by the timer 20$t$ indicates a time period during which the mobile communication terminal 10 is disconnected or detached from the external charger 50.

Additionally, since the CPU 20 and the timer 20$t$ are in a stopped state in the power-off period, a counted value of the timer 20$t$, a longest time condition and a shortest time condition described later do not make sense in relation to a charging operation in the power-off period temporarily appearing in the forcedly-on period.

When the detection result is changed from the "disconnection" to the "connection", the CPU 20 causes a charging lamp 28 to be lit in order to notify a start of a charging operation to a user. Here, whether or not the state of the mobile communication terminal 10 conflicts with a charge prohibition condition is determined by the CPU 20. If it does not conflict with the prohibition condition, a charging operation is permitted while if it conflicts with the prohibition condition, the charging operation is prohibited. In a case that the charging operation is started, when the lithium-ion rechargeable battery 38 is fully charged, the charging lamp 28 is put out. In a case that the charging operation is prohibited, the charging lamp 28 is put out after a lapse of a defined time (=20 seconds).

The charging operation is permitted by a turn-on of a constant voltage circuit 34. The constant voltage circuit 34 performs constant voltage processing on a voltage supplied from the charging terminal 30. The lithium-ion rechargeable battery 38 is charged by a constant voltage. A current detection circuit 36 detects a value of a current flowing toward the lithium-ion rechargeable battery 38 and applies a detected current value to the CPU 20. The CPU 20 turns the constant voltage circuit 34 off when the current value detected by the current detection circuit 36 indicates a numerical value corresponding to a fully-charged state of the lithium-ion rechargeable battery 38. Thus, the charging operation is ended.

The charge prohibition condition is defined by a logical product of a power source condition, a voltage condition, a longest time condition, and a shortest time condition. The power source condition is a condition that a present time period is the power-on period. The voltage condition is a condition that a terminal voltage of the lithium-ion rechargeable battery 38 is equal to or more than 4.1 volts. The longest time condition is a condition that a counted time by the timer 20$t$ is equal to or less than 60 minutes. The shortest time condition is a condition that a counted time by the timer 20$t$ is above 1.0 second (=predetermined time).

Accordingly, if the present time period is the forcedly-on period, a charging operation is permitted. This is because that by the nature of the mobile communication terminal 10, the forcedly-on period normally never occurs. If the terminal voltage of the lithium-ion rechargeable battery 38 is less than 4.1 volts, by regarding that the remaining amount of the lithium-ion rechargeable battery 38 is considerably decreased, a charging operation is permitted. It should be noted that the terminal voltage of the lithium-ion rechargeable battery 38 in the fully-charged state is 4.2 volts. Furthermore, the terminal voltage of the lithium-ion rechargeable battery 38 is detected by a voltage detection circuit 40.

If the counted time of the timer 20t is above 60 minutes, by regarding that enough blank time is spent after completion of the preceding charging operation, a charging operation is permitted irrespective of the remaining amount. Furthermore, if the counted time of the timer 20t is less than 1.0 second, by regarding that the charging terminal 30 is instantaneously detached from the external charger 50 against the user's intention, a charging operation is permitted.

Figure 2:
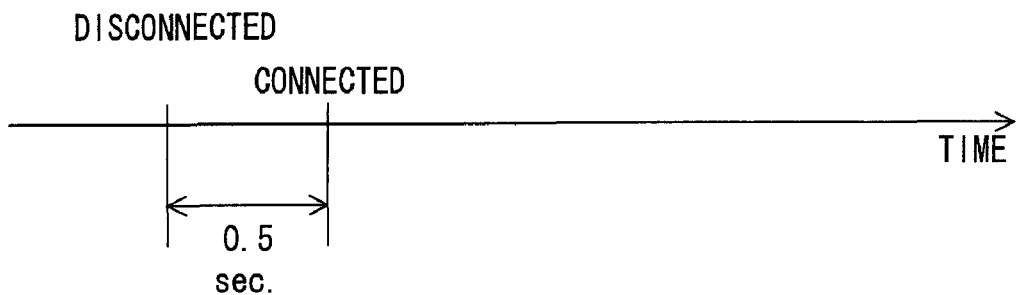
FIG. 2(A) is a timing chart showing one example of an operation of attaching and detaching a mobile communication terminal to and from a charger.
FIG. 2(B) is a timing chart showing another example of an operation of attaching and detaching the mobile communication terminal to and from the charger.
FIG. 2(C) is a timing chart showing still another example of an operation of attaching and detaching the mobile communication terminal to and from the charger.
Figure 2:
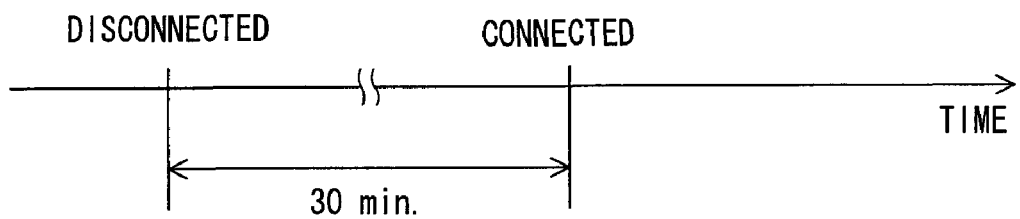
Figure 2:
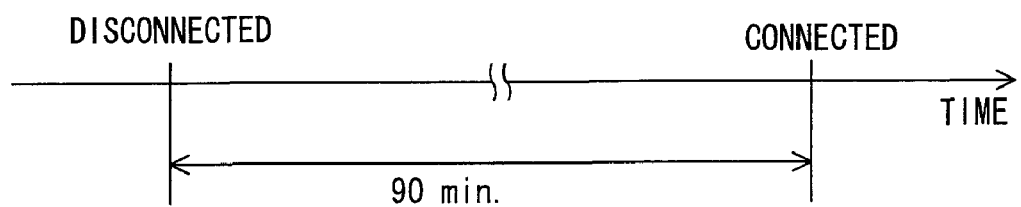

More specifically, in a case that the longest time condition and the shortest time condition are noted, when a time during which the mobile communication terminal 10 is detached or disconnected from the external charger 50 is 0.5 seconds, a charging operation is restarted soon (see FIG. 2(A)). Alternatively, when a time during which the mobile communication terminal 10 is disconnected or detached from the external charger 50 is 30 minutes, a charging operation is prohibited (see FIG. 2(B)). Further alternatively, when a time during which the mobile communication terminal 10 is detached or disconnected from the external charger 50 is 90 minutes, a charging operation is permitted (see FIG. 2(C)).

Figure 3:
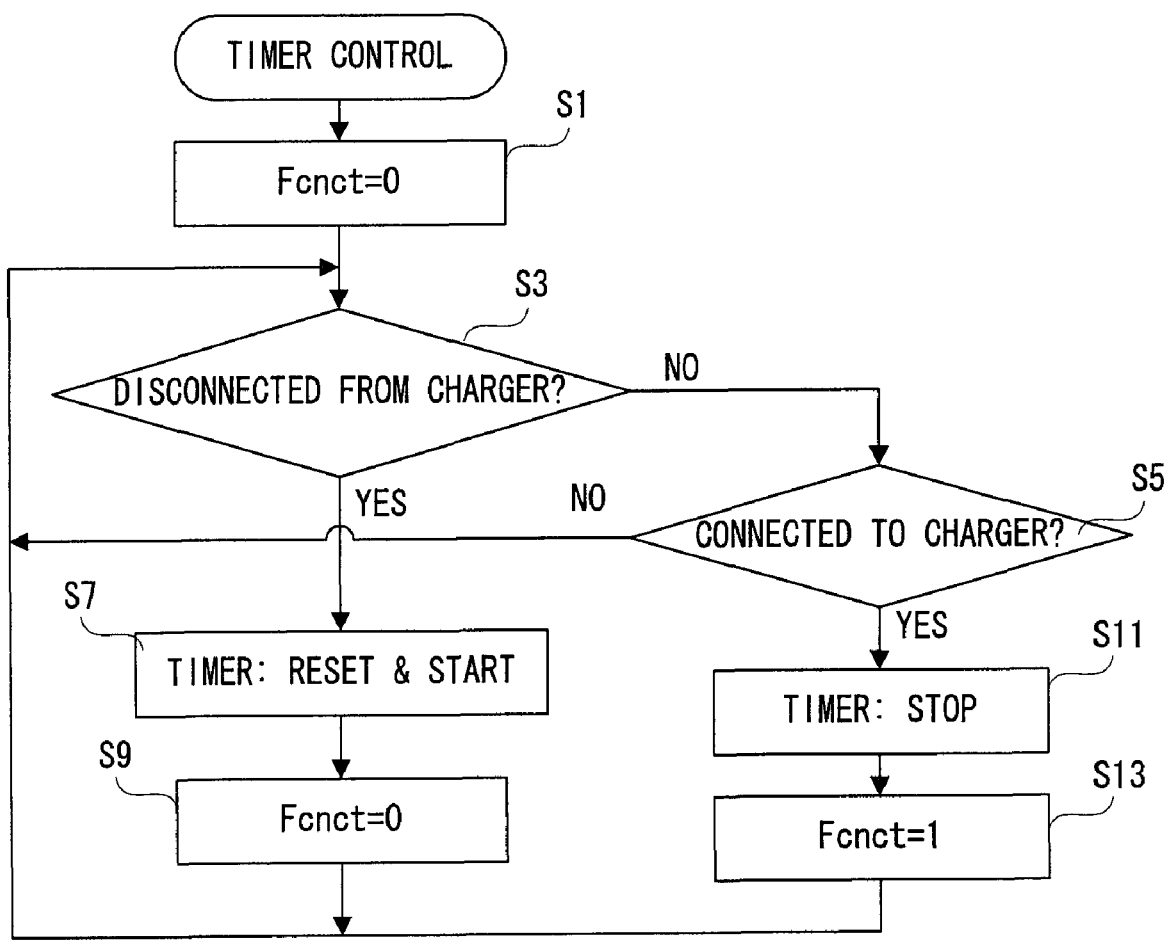
FIG. 3 is a flowchart showing a part of an operation of a CPU applied to FIG. 1 embodiment.

The CPU 20 executes a plurality of tasks including a timer controlling task shown in FIG. 3 and a charge controlling task shown in FIG. 4-7 in parallel. Here, the control programs corresponding to these tasks are stored in the flash memory.

Referring to FIG. 3, in a step S1, a flag Fcnct is set to "0". The flag Fcnct is a flag for determining whether or not the charging terminal 30 is connected to the external charger 50, and "0" indicates a disconnection while "1" indicates a connection. In a step S3, it is determined whether or not the charging terminal 30 is disconnected from the external charger 50, and in a step S5, it is determined whether or not the charging terminal 30 is connected to the external charger 50.

When the detection result of the connection detecting circuit 32 is changed from the "connection" to the "disconnection", "YES" is determined in the step S3, resetting and starting the timer 20t is executed in a step S7. In a step S9, the flag Fcnct is set to "0", and then, the process returns to the step S3. When the detection result of the connection detecting circuit 32 is changed from the "disconnection" to the "connection", "YES" is determined in the step S5, and the timer 20t is stopped in a step S11. In a step S13, the flag Fcnct is set to "1", and then, the process returns to the step S3.

After completion of the processing of step S9 or S13, so long as the detection result of the connection detecting circuit 32 indicates any one of the "connection" and the "disconnection", "NO" is determined in the step S5, and the processing in the steps S3 and S5 is repeatedly executed. Accordingly, the counted time by the timer 20t represents a time during which the mobile communication terminal 10 is disconnected from the external charger 50.

Figure 4:
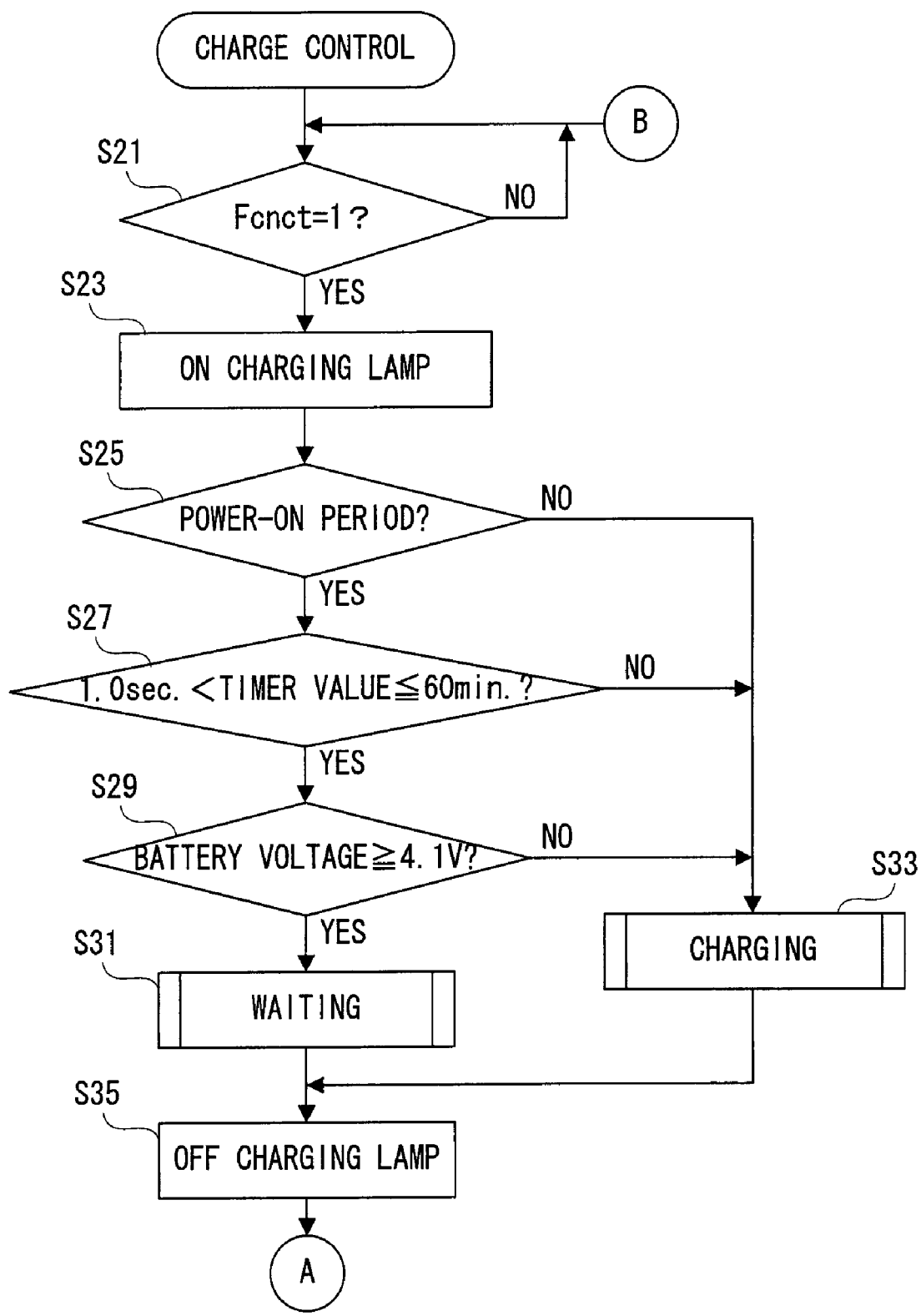
FIG. 4 is a flowchart showing another part of the CPU applied to FIG. 1 embodiment.
Figure 5:
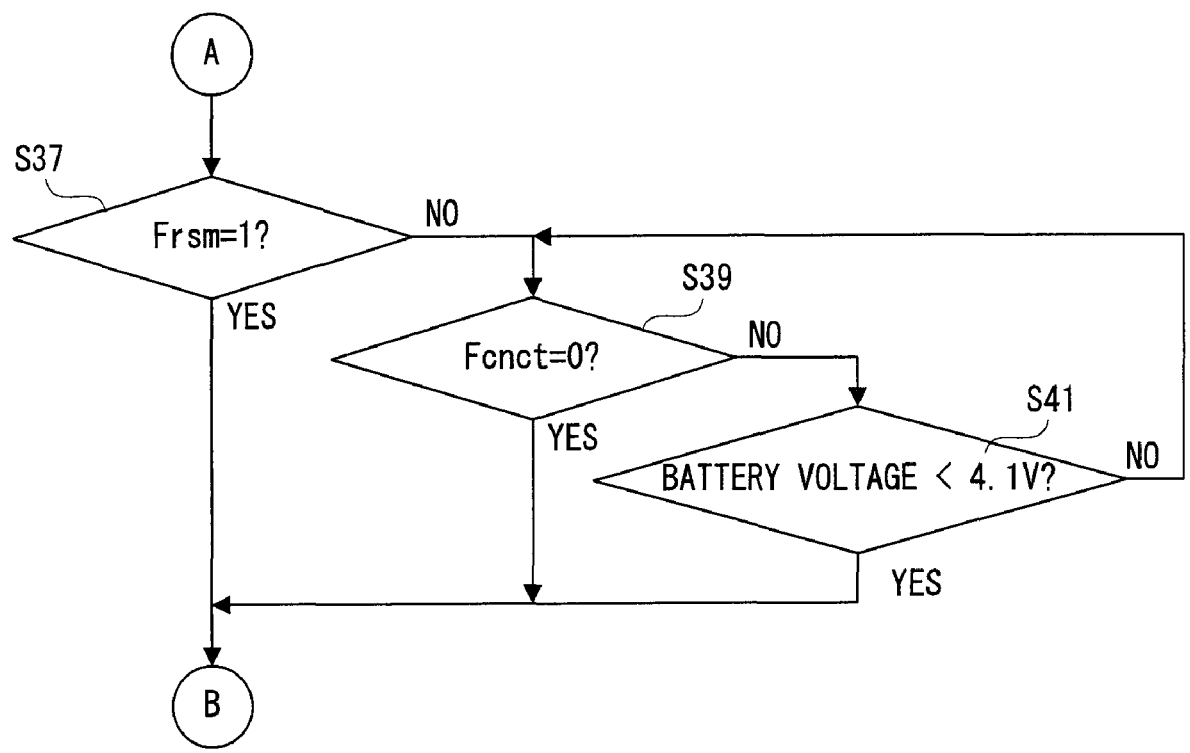
FIG. 5 is a flowchart showing a still another part of the operation of the CPU applied to FIG. 1 embodiment.

Referring to FIG. 4, in a step S21, it is determined whether or not the flag Fcnct is "1", that is, whether or not the charging terminal 30 is a connected state, and if "YES" is determined, the charging lamp 28 is illuminated in a step S23. A current period is determined in a step S25, a counted time by the timer 20t is determined in a step S27, and a terminal voltage of the lithium-ion rechargeable battery 38 is determined in a step S29.

If the present time period is the forcedly-on period, the process proceeds from the step S25 to a step S33. If the counted time of the timer 20t is equal to or less than 1.0 second or is above 60 minutes, the process proceeds from the step S27 to a step S33. If the terminal voltage of the lithium-ion rechargeable battery 38 is less than 4.1 volts, the process proceeds from the step S29 to the step S33. On the contrary thereto, if the main power source is in an on-state, and the counted time of the timer 20t is above 1.0 second and less than 60 minutes, and the terminal voltage of the lithium-ion rechargeable battery 38 is equal to or more than 4.1 volts, the process proceeds to a step S31. In the step S31, waiting processing is executed, and in the step S33, charging processing is executed. The charging operation is prohibited by the processing in the step S31, but is permitted by the processing in the step S33.

In a step S35, the charging lamp 28 is turned off, and in a step S37, it is determined whether or not a flag Frsm is "1". The flag Frsm is a flag for determining whether or not the processing beginning from the step S21 is to be rapidly restarted. Here, "1" indicates that a rapid restart is required, and "0" indicates a rapid restart is not required. If "YES" is determined in the step S37, the process rapidly returns to the step S21, and if "NO" is determined in the step S37, the process returns to the step S21 through the processing in steps S39-S41.

In the step S39, it is determined whether or not the flag Fcnct is "0", and in the step S41, it is determined whether or not the terminal voltage of the lithium-ion rechargeable battery 38 is less than 4.1 volts. If "YES" is determined in the step S39 or S41, the process returns to the step S21 while if "NO" are determined in both of the step S39 and S41, the processing in the step S39 and S41 are repeated.

That is, so long as the charging terminal 30 is connected to the external charger 50, and the terminal voltage of the lithium-ion rechargeable battery 38 is equal to or more than 4.1 volts, returning to the step S21 is hold. In other words, when the remaining amount of the lithium-ion rechargeable battery 38 is reduced because communication processing is executed in a state that the mobile communication terminal 10 is connected to the external charger 50, for example, or when the charging terminal 30 is disconnected from the external charger 50, the processing in the step S21 is restarted.

Figure 6:
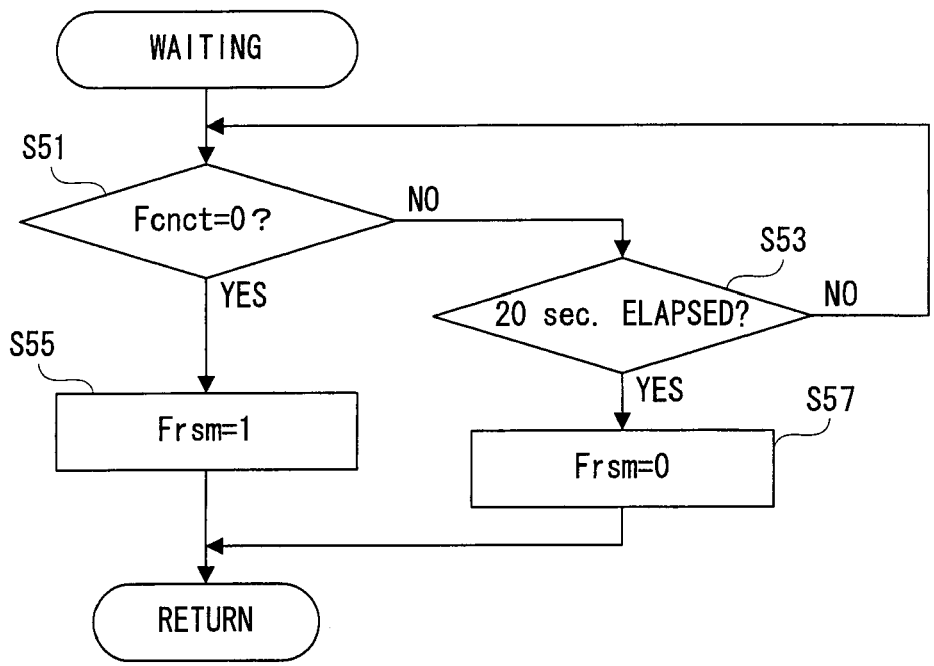
FIG. 6 is a flowchart showing a further part of the operation of the CPU applied to FIG. 1 embodiment.

The waiting processing in the step S31 is executed according to a subroutine shown in FIG. 6. In a step S51, it is determined whether or not the flag Fcnct is "0", and in a step S53, it is determined whether or not 20 seconds have elapsed from the start of the waiting processing. If "YES" is determined in the step S51, the flag Frsm is set to "1" in a step S55, and the process is restored to the routine at the hierarchical upper level. Alternatively, if "YES" is determined in the step S53, the flag Frsm is set to "0" in a step S57, and the process is restored to the routine at the hierarchical upper level.

Figure 7:
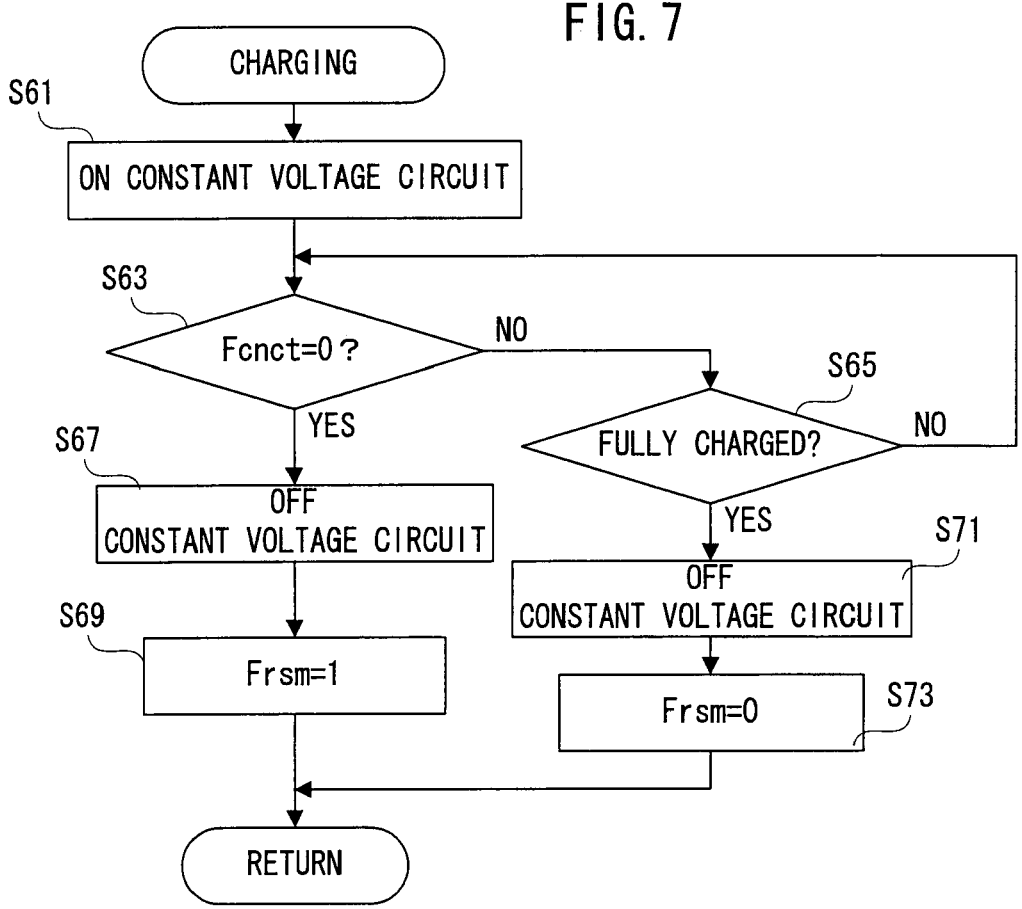
FIG. 7 a flowchart showing a still further part of the operation of the CPU applied to FIG. 1 embodiment.

The charging processing in the step S33 is executed according to a subroutine shown in FIG. 7. In a step S61, the constant voltage circuit 34 is turned on. Thus, charging the lithium-ion rechargeable battery 38 is started. In a step S63, it is determined whether or not the flag Fcnct is "0", and in a step S65, it is determined whether or not the lithium-ion rechargeable battery 38 is in a fully-charged state. In the determination of the step S65, the detection result of the current detection circuit 36 is referred.

If "YES" is determined in the step S63, the constant voltage circuit 34 is turned off in a step S67, and the flag Frsm is set to "1" in a step S69. If "YES" is determined in the step S65, the constant voltage circuit 34 is turned off in a step S71, and the flag Frsm is set to "0" in a step S73. The charging operation is terminated by turning the constant voltage circuit 34 off. After completion of the processing in the step S69 or S73, the process is restored to the routine at the hierarchical upper level.

As understood from the above description, an electric power supplied from the external charger 50 to the lithium-ion rechargeable battery 38 is taken by the charging terminal 30. When the charging terminal 30 is connected to the external charger 50, whether or not the charge prohibition condition is satisfied is determined by the CPU 20 (S25, S27, S29). The charging operation is prohibited when the determination result is affirmative (S31), but is permitted when the determination result is negative (S33). Here, the charge prohibition condition includes the shortest time condition that a time during which the charging terminal 30 is disconnected from the external charger 50 is above a defined time (=time period above 1.0 second) decided in view of instantaneous power interruption.

Accordingly, when the time during which the charging terminal 30 is disconnected is above the defined time, the charging operation is prohibited while the time during which the charging terminal 30 is disconnected is equal to or less than the defined time, the charging operation is permitted. Thus, when the charging terminal 30 is disconnected from the external charger 50 for several dozen seconds, even if the charging terminal 30 is then connected to the external charger 50, the charging operation is prohibited. Thus, it is possible to prevent degradation or deterioration of the lithium-ion rechargeable battery 38 due to frequent charging operations. On the contrary thereto, when the charging terminal 30 is merely instantaneously disconnected from the external charger 50 against the user's will, the charging operation is rapidly restarted. Thus, it is possible to avoid an interruption of the charging operation against the user's will.

In addition, the lithium-ion rechargeable battery is assumed as a secondary battery in this embodiment, but a lithium polymer battery may be used in place of this. Furthermore, although the mobile communication terminal is assumed in this embodiment, any electronic equipment driven by the secondary battery can be applied without being limited to this.

Furthermore, in this embodiment, the charging terminal 30 has to be connected to the external charger 50 for performing a charging operation, but the charging terminal 30 is not needed if a non-contact charging system is adopted. In this case, a primary coil and a secondary coil are provided to a charger and a mobile communication terminal, respectively, and a power supply has to be received by electromagnetic induction. It should be noted that a connection and a disconnection with the charger is determined by noting a change of a voltage or a magnetic field.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A charge controlling circuit comprising: a first determiner for determining whether or not a charging power supplied from an external charger to a secondary battery is present; a second determiner for determining whether or not a charge prohibition condition is satisfied when it is determined that a charging power supplied from said external charger to said secondary battery is present by said first determiner; a prohibiter for prohibiting a charging operation when it is determined that said charge prohibition condition is satisfied by said second determiner; and a permitter for permitting said charging operation when it is determined that said charge prohibition condition is not satisfied by said second determiner, wherein said charge prohibition condition includes a time condition which is determined by said first determiner that the charging power supplied from said external charger to said secondary battery is interrupted above a defined time including a predetermined time or more.

2. A charge controlling circuit according to claim 1, further comprising an activator for activating a timer when supply of said charging power is interrupted; and a stopper for stopping said timer when supply of said charging power is started, wherein
the time defining said time condition corresponds to a counted time by said timer.

3. A charge controlling circuit according to claim 1, wherein said charge prohibition condition further includes a power source condition that a present time belongs to a period from a power-on operation to a power-off operation.

4. A charge controlling circuit according to claim 1, wherein said charge prohibition condition further includes a voltage condition that a voltage of said secondary battery is above a threshold value.

5. A mobile terminal comprising a charge controlling circuit according to claim 1.

6. A storage medium being machine-readable by a processor of a charge controlling circuit, said storage medium stores a program which causes said processor to execute: a first determining step for determining whether or not a charging power supplied from an external charger to a secondary battery is present; a second determining step for determining whether or not a charge prohibition condition is satisfied when it is determined that a charging power supplied from said external charger to said secondary battery is present by said first determining step; a prohibiting step for prohibiting a charging operation when it is determined that said charge prohibition condition is satisfied by said second determining step; and a permitting step for permitting said charging operation when it is determined that said charge prohibition condition is not satisfied by said second determining step, wherein said charge prohibition condition includes a time condition that a time during which it is determined by said first determining step that the charging power supplied from said external charger to said secondary battery is interrupted above a defined time including a predetermined time or more.

7. A charge controlling method in a charge controlling circuit, including following steps of: a) determining whether or not a charging power supplied from an external charger to a secondary battery is present; b) determining whether or not a charge prohibition condition is satisfied when it is determined that a charging power supplied from said external charger to said secondary battery is present by said first determining step; c) prohibiting a charging operation when it is determined that said charge prohibition condition is satisfied by said second determining step; and d) permitting said charging operation when it is determined that said charge prohibition condition is not satisfied by said second determining step, wherein said charge prohibition condition includes a time condition that a time during which it is determined by said first determining step that the charging power supplied from said external charger to said secondary battery is interrupted above a defined time including a predetermined time or more.

* * * * *